United States Patent
Wynman

(10) Patent No.: US 7,763,992 B2
(45) Date of Patent: Jul. 27, 2010

(54) UNIVERSAL INTERFACE FOR BATTERY CHARGER

(75) Inventor: Stanley J. Wynman, Bogota, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 28 days.

(21) Appl. No.: 11/960,127

(22) Filed: Dec. 19, 2007

(65) Prior Publication Data
US 2008/0238206 A1 Oct. 2, 2008

Related U.S. Application Data

(60) Provisional application No. 60/908,975, filed on Mar. 30, 2007.

(51) Int. Cl.
*H02J 9/00* (2006.01)
(52) U.S. Cl. .................................................. 307/66
(58) Field of Classification Search .................. 307/66
See application file for complete search history.

(56) References Cited

U.S. PATENT DOCUMENTS

| 6,215,281 B1* | 4/2001 | Koch .......................... 320/150 |
| 2006/0188090 A1* | 8/2006 | Paulsen et al. ......... 379/413.04 |

* cited by examiner

*Primary Examiner*—Robert L. Deberadinis

(57) ABSTRACT

A battery pack module having a battery and a battery charger suitable for re-charging the battery. The battery pack powers a network terminal such as an optical network terminal (ONT) upon utility-company power failure. Upon return of power from the power utility company the battery charger automatically re-charges the battery. A different battery pack having different battery charger and battery with different battery chemistry can be exchanged for the original battery pack housed within the ONT without requiring any mechanical or electrical modification to the ONT. A battery temperature sensing device in cooperation with a microprocessor, both included with the battery pack, ensures that the recharging of the battery is performed efficiently.

17 Claims, 4 Drawing Sheets

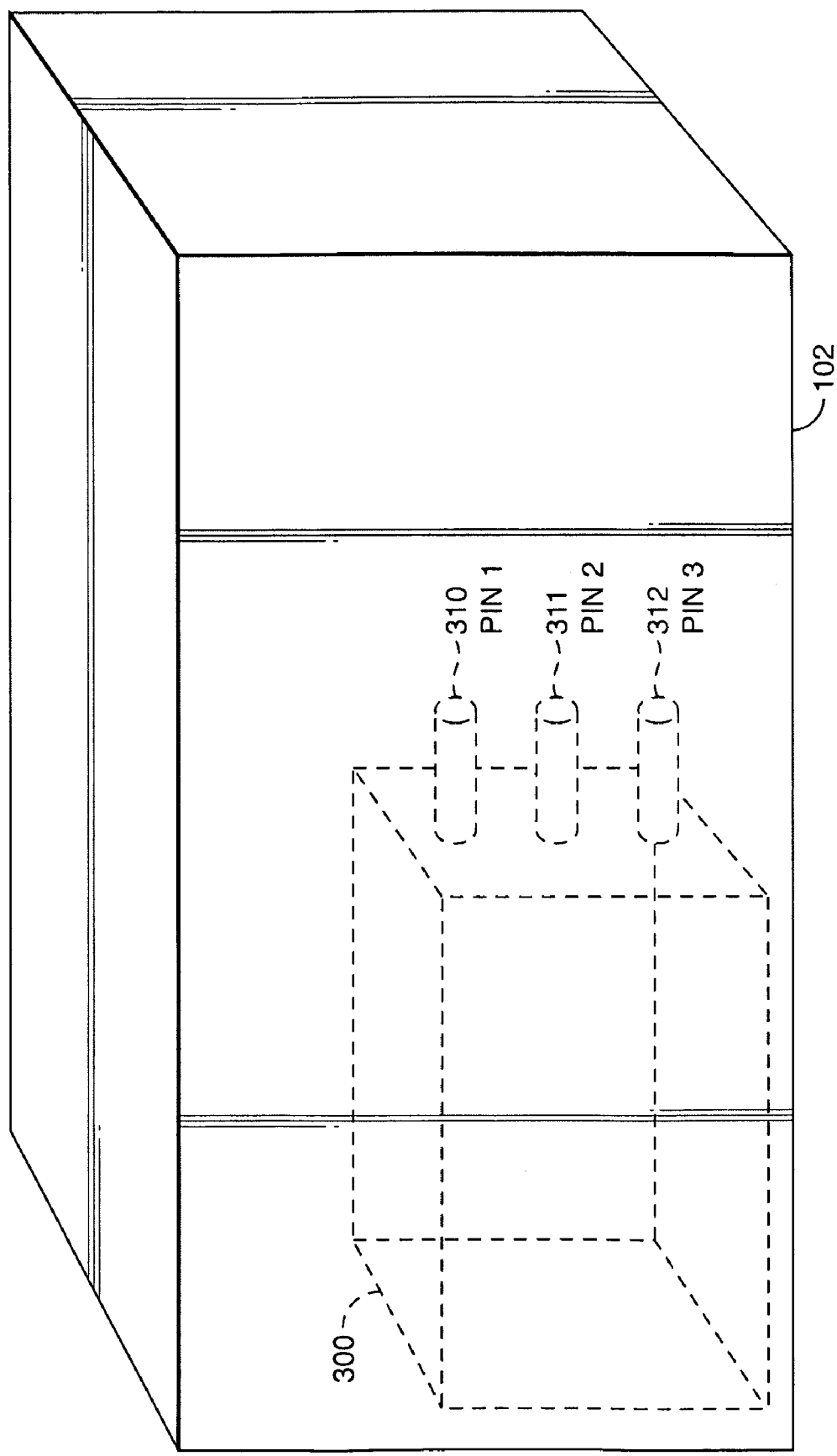

US 7,763,992 B2

UNIVERSAL INTERFACE FOR BATTERY CHARGER

RELATED APPLICATIONS

This application claims the benefit of U.S. provisional application No. 60/908,975, filed Mar. 30, 2007, the contents of which are incorporated herein by reference in their entirety.

BACKGROUND

Telecommunication companies that are installing fiber to the premises (FTTP) are also installing battery backup units (BBU) which are needed to power the FTTP network during a power failure for a finite period of time. Currently, the industry uses set battery chemistries—a single kind of battery—and that can be too limiting. Thus, it is desirable to not be constrained to only one type of battery, such as a sealed lead acid battery, which may cause a customer to complain for environmental or safety reasons.

Moreover, when installing FTTP in homes, sometimes batteries are taken, without authorization, out of the optical network terminal (ONT) units (e.g., by customers for their own unrelated uses). In that adverse environment, it would be helpful to install non-rechargeable alkaline batteries where they have no further use after they are discharged. By contrast, where other battery chemistries are preferred, it might be more useful to use lithium ion batteries or nickel metal hydride batteries which are rechargeable and have better characteristics, generally speaking, than the alkaline batteries.

Currently, there is no easy manner by which these batteries can be inter-changed, because the battery chargers that are needed to charge the various rechargeable batteries are all different from each other to accommodate the chemistries of the rechargeable batteries which also are all different from each other. This can result in an inconvenient, costly and inefficient retrofitting procedure to remove the old battery charger associated with the old battery and to install a new battery charger associated with the new battery.

Therefore, there is a need for systems and methods by which these kinds of rechargeable batteries can be changed to other batteries responsive to need, and thereafter be recharged as may be needed during power failures, without making any other changes.

DETAILED DESCRIPTION OF PREFERRED EMBODIMENTS

Exemplary embodiments include methodology and apparatus for providing a universal battery interface for a telecommunications and/or a data unit such as an ONT unit. The interface comprises a battery pack which includes a battery and a compatible charger for the battery. The battery pack also includes an electrical pin-out, the configuration of which can be standardized for ONT application. The pin-out includes a ground pin, a voltage output pin and a voltage charging pin. The ONT unit is configured to mate with the battery pack in a modular manner and further includes an electrical receptacle for receiving the ground pin, the voltage output pin and the voltage charging pin. Thereby, the battery pack can be easily unplugged from the ONT and a new battery pack (battery and charger) can be plugged in, without making any modifications to the ONT. The present invention thus allows battery/charger assemblies to be interchanged within a pre-configured "enclosure" contained within the ONT and without charging a battery that is not meant to be charged or charging a battery incorrectly; correct battery charging is guaranteed by virtue of the pre-determined battery-charger combination.

Figure 1:
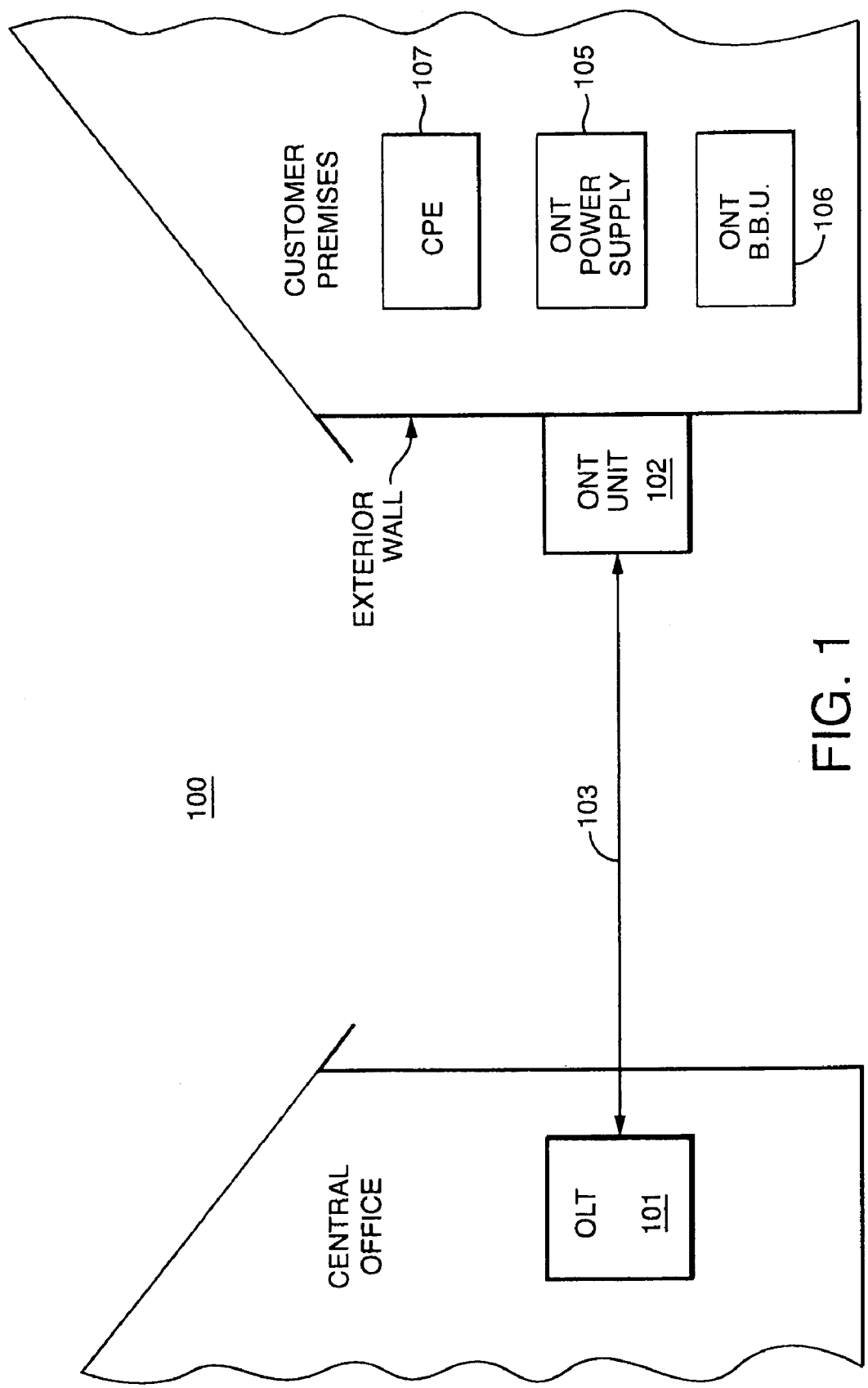
FIG. 1 depicts an exemplary FTTP communication system showing the locations of various system components.
Figure 2:
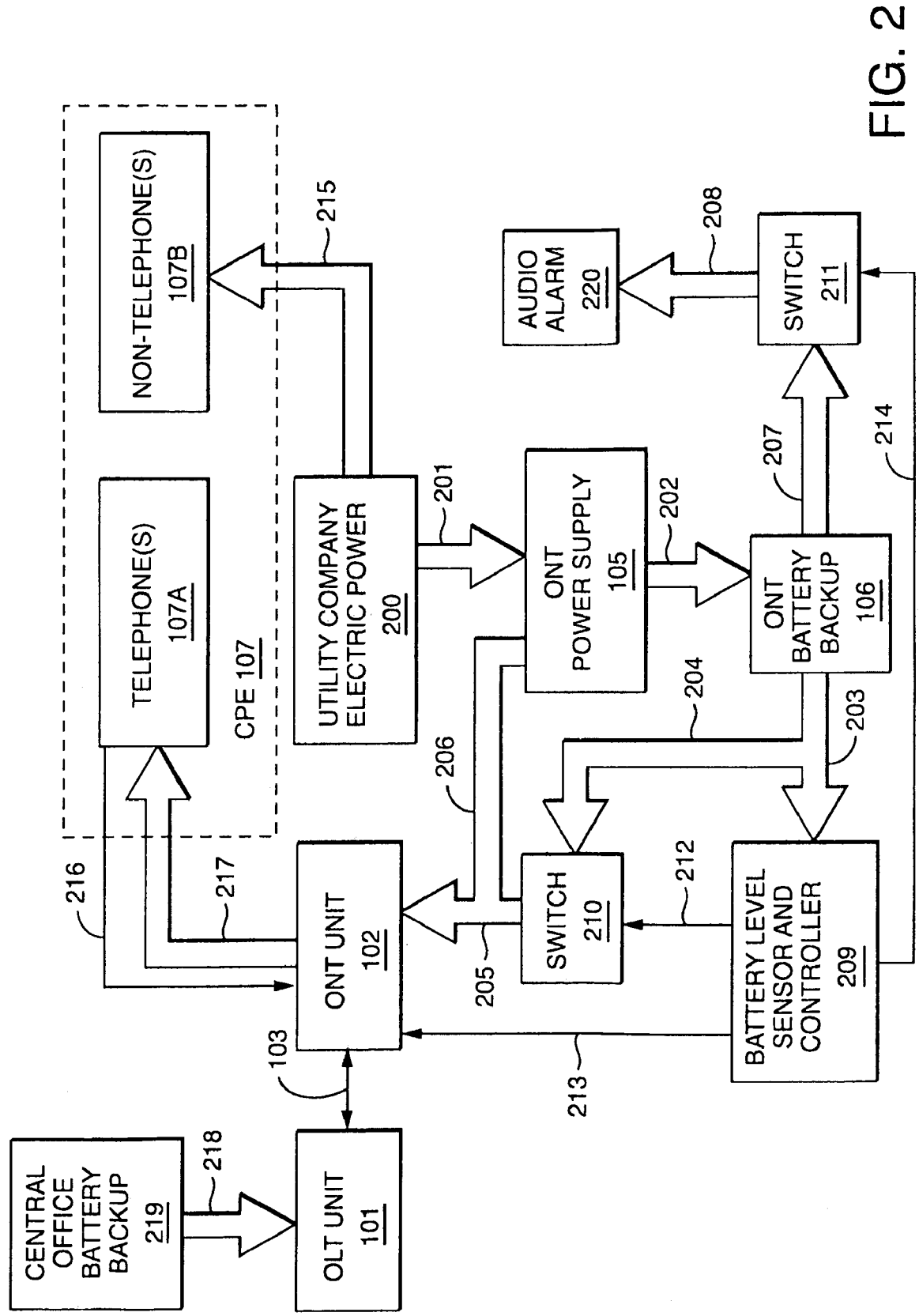
FIG. 2 is an exemplary schematic block diagram showing signal paths and power paths between various system components including those of FIG. 1.

FIGS. 1 and 2 are identical to FIGS. 1 and 2 of U.S. patent application Ser. No. 11/460,499, filed Jul. 27, 2006 and entitled "OPTICAL NETWORK TERMINAL POWER FAILURE MANAGEMENT," which application is incorporated by reference herein in its entirety.

While FIG. 1 shows the ONT unit 102 mounted outside the customer premises, the ONT unit is now often mounted inside the customer premises. In FIGS. 1 and 2, ONT BBU 106 is shown as being physically separated from ONT unit 102 but, in exemplary embodiments, the BBU function can be physically and modularly located within ONT unit 102. In other words, the functional equivalent of BBU 106 can be plugged into and plugged out from ONT unit 102, as discussed further hereinbelow.

Figure 3:
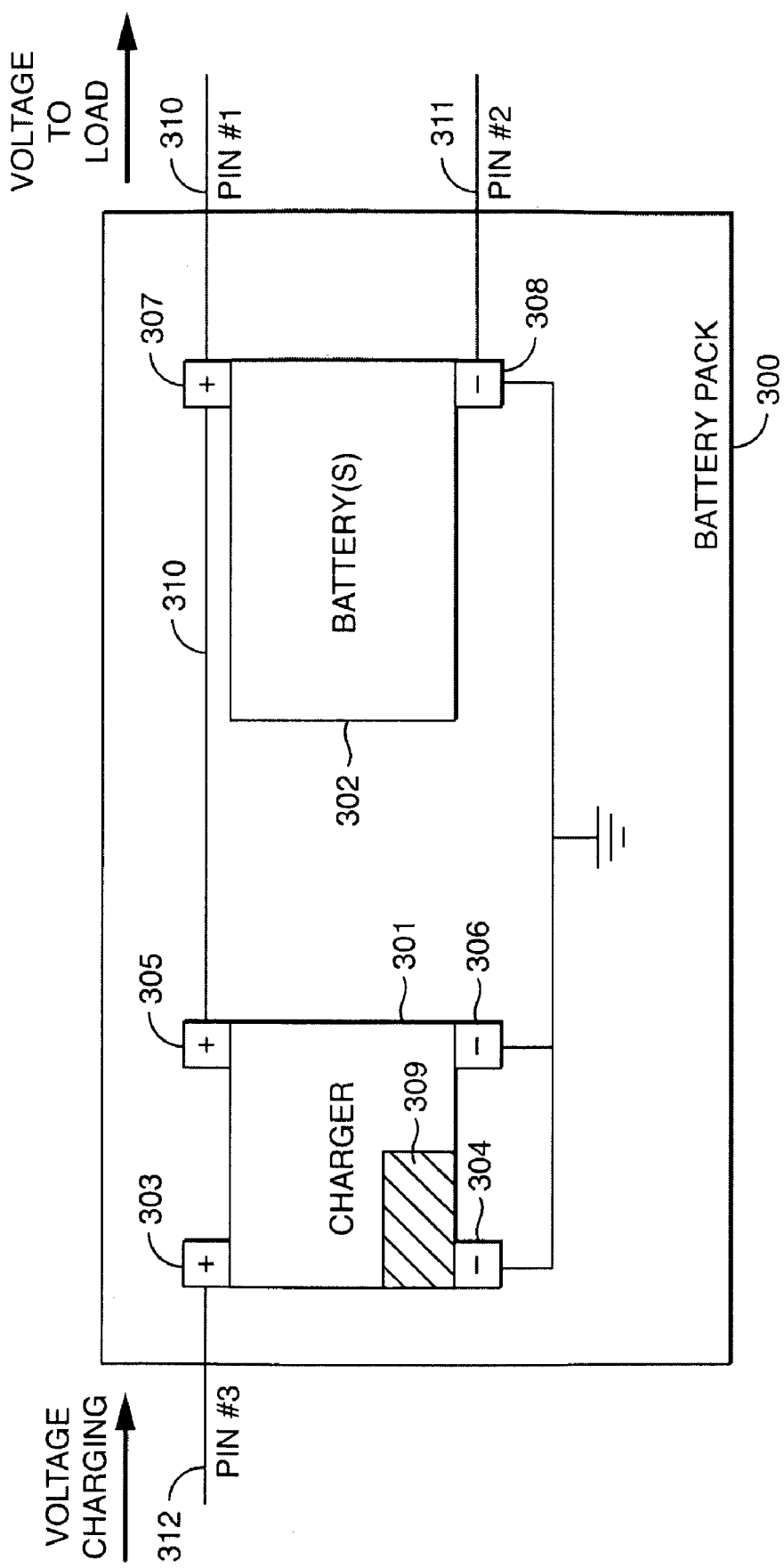
FIG. 3 is a schematic diagram of an exemplary battery pack showing how a charger and a battery can be interconnected within the battery pack; and, FIG. 4 shows an exemplary battery pack, including pin-out, as would be received, for example, by an ONT unit.

FIG. 3 is a schematic diagram of a battery pack including a battery and a battery charger. Battery pack 300 includes battery(s) 302 and battery charger 301 as a self contained assembly or cartridge or modular component. Different battery chemistries require different kinds of battery chargers. Battery charger 301 is designed or tailor-made to be compatible with the battery chemistry of battery 302. Battery charger 301 has terminals 303, 304, 305 and 306. Terminals 304 and 306 are ground terminals. Terminal 303 is connected to pin #3, shown as line 312 and is used to receive voltage to charger 301. The voltage received is higher than the voltage to be applied to the battery and can be a constant DC voltage level or a varying DC voltage level. The voltage coming out of terminals 305 and 306 from charger 301 is the correct voltage for charging battery 302.

Microprocessor and temperature sensing module 309 is contained within charger 301 and is used to sense the battery temperature. This can be done by way of temperature sensors (not shown) which are attached to the battery, the data of which is fed back into the microprocessor and temperature sensing module 309 for processing purposes. Different battery chemistries operate within prescribed temperature ranges at optimum efficiency and are charged more efficiently at particular temperatures or within particular temperature ranges. This module can be contained within each charger for its companion battery. The charging characteristics of the charging voltage which is applied to actual battery cell terminals, varies as a function of temperature. For example, in lithium ion batteries, the temperature is higher as compared with some other battery chemistries. Also, with this battery chemistry, there can be cell to cell voltage variation from one battery to the next, even if manufactured on the same line, and monitoring is necessary or desirable. Temperature sensing is a part of the algorithm used to determine the charging voltage and current.

Battery 302 has terminals 307 and 308. Terminals 305 and 306 from the charger are connected to battery terminals 307 and 308, respectively, and are used to charge the battery by way of conductive line 310. Terminal 307 is connected to pin #1, shown as line 310, and ground terminal 308 is connected to pin #2, shown as line 311. The voltage output from Pin #1 can be applied to the load (e.g., the ONT unit).

The battery charger is used to provide charging to the battery after it has been depleted because it has been used to supply power to the ONT during a utility company's power failure. Thus, the battery charger receives power only after utility company power has been restored. The battery charger is designed to be unique to any given battery chemistry that has unique requirements from a charging perspective. The charger itself may be conventional, but is applicable to the particular battery chemistry with which it is partnered.

For example, with a sealed lead acid battery, its charger can be a circuit that receives the fixed or slightly varying input DC voltage after the lost power is restored, measures temperature of the battery, adjusts the voltage being applied to the battery downward from the voltage being applied to the charger, and applies the appropriate constant voltage to the rechargeable battery. Such a battery is self-regulating from a current perspective.

But, with a lithium ion battery, the voltage can be temperature compensated and turned on and off depending upon the inter-cell voltages and the temperature. The charger associated with this battery chemistry typically uses a more sophisticated, microprocessor-driven charger system. All of this functionality can be contained within module 309 within charger 301 of FIG. 3.

FIG. 4 shows battery pack 300 in dashed line format as hidden lines as it might be seated or modularly inserted within the housing of ONT unit 102. In FIG. 1, ONT unit 102 is shown as being positioned outside of the customer premises. In the instant invention, ONT can be positioned inside the customer premises, where space is more of a premium and where battery type may be more critical.

Pin #1, Pin #2 and Pin #3 are shown in dashed line format and are received by female receptacles (not shown) fixedly mounted within ONT unit 102. Any other battery pack with its compatible charger made in accordance with exemplary embodiments would fit within the opening of the ONT unit 102, just as the unit shown in FIG. 4, and its pin out configuration can also mate with the female receptacles just as those shown in FIG. 4. In other words, the battery pack can be invisible to the ONT and any battery pack designed for use with the ONT, and that meets this spatial configuration and pin out configuration, shall work as well as any other.

In the event of using a non-rechargeable battery, like an alkaline battery, there would typically not be a charger associated with it, and so only pins #1 and #2 might be included. They would fit into the appropriate pin #1 and pin #2 receptacles, respectively, and pin #3 may not exist in such case because it may be superfluous. Alternatively, pin #3 could exist, but not be electrically utilized because it is electrically disconnected.

The location of the batten pack within ONT unit 102 is particularly convenient, but it can also be housed instead within a battery backup chassis physically removed from the ONT unit. Transmission of power from the physically-removed battery pack to the ONT during power outages can then be accomplished by hard wiring between the battery pack and the ONT unit.

Exemplary embodiments allow for the use of any battery chemistry in an ONT battery back up situation. By having the ONT battery interface defined in terms of power needs, the actual battery charging algorithm can be integrated into the battery pack. Advantageously, this allows for usage and cost choices.

Since the introduction of the FTTP platform, there has been demand for alternate battery sizing and chemistries in the DC uninterrupted power supply (UPS). The reason for the choice involves costs, battery support times, and a desire for various battery chemistries.

Exemplary embodiments provide a universal battery interface to a DC UPS based system, and thereby allow a host device to supply constant or variable output voltage and current for application to a battery pack.

In exemplary embodiments, current may only flow from the host to the battery pack. The battery interface can also include a pin which accepts power from the battery. This pin allows power to flow only from the battery to the load. A third pin can exist as a ground, or common point, which can be utilized for each of the previously identified interfaces.

With such an interface, a battery pack can be connected to the battery interface or UPS. The battery pack can consist of any required battery chemistry as well as a battery charger which is dedicated to the chemistry of the battery.

Thermal sensors can be included to eliminate thermal run-a-way conditions as well as optimizing the battery charge based on battery temperature. The active components can disconnect the battery at a low voltage point based on the needs of the battery chemistry.

A non-rechargeable battery pack can also be utilized in which the recharge pin is not utilized.

While illustrative embodiments of the present invention have been shown and described, numerous variations and alternative embodiments may occur to those skilled in the art. For example, the three pins can be configured in a manner so that the combined charger/battery assembly or battery pack must be inserted in a particular orientation to engage the three pins, thereby assuring proper insertion into the receptacle space of the ONT unit. And, although the ONT unit is now typically positioned inside the customer premises, it can be re-positioned outside as well. Other variations and alternative embodiments are contemplated, and can be made without departing from the spirit and scope of the present invention as defined in the appended claims.

What is claimed is:

1. A universal battery interface for a telecommunications and/or data unit such as an optical network terminal (ONT) comprising:

a battery pack including a battery and a compatible charger for said battery, wherein said battery pack is contained in a chassis and an electrical pin configuration extends from said battery pack chassis, wherein said pin configuration includes a ground pin, a voltage output pin for providing voltage for powering said ONT and a voltage charging pin for permitting said charger to charge said battery after the voltage of said battery has been completely or partially depleted after serving as a backup source of power for said ONT when utility power to said ONT has failed, wherein said ONT includes a component slot configured to matingly receive said battery pack chassis, said slot including an electrical receptacle having said pin configuration for receiving said ground pin, said voltage output pin and said voltage charging pin upon complete insertion of said battery pack chassis into said slot, and wherein said battery pack can be easily removed and replaced with a different battery pack having a different chassis substantially identical to said chassis and a pin configuration substantially identical to said pin configuration and containing a substitute battery having chemistry different from said battery, without requiring any modifications to said ONT to accommodate insertion and operation of said different battery pack.

2. The interface of claim 1 wherein said pin configuration in combination with configuration of said slot prevents improper insertion of pins of said pin configuration into said electrical receptacle.

3. Apparatus, comprising:
a network terminal; and
a rechargeable battery pack module including at least one battery being any battery selected from a plurality of batteries each having a different battery chemistry, said module configured to modularly plug into, and out from, said network terminal without mechanical modification to said network terminal;
wherein said terminal is automatically powered by said at least one battery upon failure of utility company power to said terminal, and said at least one battery is automatically recharged by said utility company power upon restoration of said utility company power to said terminal.

4. The apparatus of claim 3 wherein said rechargeable battery pack module comprises:
a charger-battery combination, selected from a plurality of different charger-battery combinations, a charger of each one of said combinations being compatible with a respective battery of said each one of said combinations.

5. The apparatus of claim 4 wherein any one of said different combinations operates with said terminal as well as any other one of said different combinations.

6. The apparatus of claim 3 wherein said terminal is an optical network terminal (ONT).

7. The apparatus of claim 4 wherein said charger comprises:
a microprocessor and temperature sensing module for sensing operating temperature of said battery and for controlling said automatic recharge to be efficient for said battery.

8. The apparatus of claim 4 wherein each said respective battery is selected from the group of batteries consisting of: lead acid battery, lithium ion battery and nickel metal hydride battery.

9. The apparatus of claim 4 wherein voltage applied to said charger is a constant DC voltage, or a varying DC voltage, and voltage from said charger is correct voltage for charging said battery.

10. A method, comprising:
inserting a first rechargeable battery pack module including a first charger-battery combination for a first battery constructed in accordance with a first chemistry into a slot configured in a chassis of a network terminal to obtain first battery back-up capability for said terminal;
powering said network terminal by said first battery when utility-company power to said network terminal fails;
automatically recharging said first battery when said utility-company power to said network terminal is restored;
subsequent to said recharging, removing said first rechargeable battery pack module from said slot and, without re-configuring said slot or said chassis, inserting a second rechargeable battery pack module including a second charger-battery combination for a second battery constructed in accordance with a second chemistry into said slot to obtain second battery back-up capability for said terminal.

11. The method of claim 10 wherein said first chemistry of said first battery and said second chemistry of said second battery are selected from the group of battery chemistries including: lead acid, lithium ion and nickel metal hydride chemistries.

12. The method of claim 10 wherein said network terminal is an optical network terminal (ONT).

13. The method of claim 10 further comprising:
sensing temperature of said first battery; and
performing said recharging in accordance with an algorithm partially based on said temperature to achieve efficient recharging of said battery.

14. A method, comprising:
inserting a first rechargeable battery pack module including a first charger-battery combination for a first battery constructed in accordance with a first chemistry into a slot configured in a chassis of a network terminal to obtain first battery back-up capability for said terminal; and
removing said first rechargeable battery pack module from said slot and, without re-configuring said slot or said chassis, inserting a second rechargeable battery pack module including a second charger-battery combination for a second battery constructed in accordance with a second chemistry into said slot to obtain second battery back-up capability for said terminal.

15. The method of claim 14 wherein said network terminal is an optical network terminal (ONT).

16. Apparatus, comprising:
a network terminal; and
a rechargeable battery pack module including at least one battery being any battery selected from a plurality of batteries each having a different battery sizing, said module configured to modularly plug into, and out from, said network terminal without mechanical modification to said network terminal.

17. The apparatus of claim 16 wherein said terminal is automatically powered by said at least one battery upon failure of utility company power to said terminal, and said at least one battery is automatically recharged by said utility company power upon restoration of said utility company power to said terminal.

* * * * *